Patented June 22, 1954

2,681,898

UNITED STATES PATENT OFFICE 2,681,898

BLENDS OF POLYSTYRENE, HIGH STYRENE-LOW BUTADIENE RESINOUS COPOLYMERS AND BUTADIENE-STYRENE RUBBERY COPOLYMERS

Lawrence E. Daly, Mishawaka, Ind., assignor to United States Rubber Company, New York, N. Y., a corporation of New Jersey No Drawing. Application February 1, 1952,
Serial No. 269,598

6 Claims. (Cl. 260—45.5)

This invention relates to resin-rubber mixtures and more particularly to mixtures of polystyrene, high styrene-low butadiene resinous copolymers and butadiene-styrene rubbery copolymers.

Polystyrene is a widely used thermoplastic resin. Although it is inexpensive it is subject to serious disadvantages chief among which are that it has to be molded using full compression molds, or by injection molding, and it is exceedingly deficient in impact resistance.

It has been proposed to blend polystyrene with various rubbery copolymers of butadiene and another copolymerizable monomer such as styrene. However, such blends do not have a suitably high resistance to impact.

It has also been proposed to blend polystyrene with resinous copolymers of a major proportion of styrene and a minor proportion of butadiene. However, it is difficult to form such blends into smooth calendered sheets. It is also difficult, if not impossible, to form sheets of such blends by drawing operations. Moreover such blends do not have the high impact strength required for articles subject to severe service conditions.

My invention is based upon the discovery that a material having remarkable impact resistance in combination with excellent tensile strength, flexural modulus and other physical properties can be made by providing an intimate uniform mixture of polystyrene, a resinous copolymer of a high proportion of styrene and a low proportion of butadiene and a rubbery copolymer of a high proportion of butadiene and a low proportion of styrene. These raw materials are cheap and readily available with the result that the compositions of my invention can be made available in large quantities at prices in the same range as polystyrene resins which have been the cheapest and most available plastic materials. At the same time, however, the compositions of the present invention have much better impact resistance than the polystyrene resins and unlike the polystyrene resins do not have to be injection or compression molded but can be shaped by the well-known drawing procedures which involve laying a sheet of the heated plastic material over a male or female die and drawing into close conformity therewith.

In the preferred practice of my invention, I mix polystyrene and the above-described rubbery butadiene-styrene copolymer with a high styrene-low butadiene resinous copolymer having an ASTM heat distortion temperature (264 p. s. i.) of at least 140° F. I have found that the use of such a resinous styrene-butadiene copolymer gives rise to a mixture having a heat distortion temperature by said test of at least 150° F. and typically ranging between 160 and 190° F. Such high heat distortion temperatures coupled with the high impact strength and other excellent physical properties of mixtures made with such a resinous copolymer cause these mixtures to be extremely important commercially. This is particularly the case when the low cost of manufacture and the possibility of using drawing procedures for shaping rather than relatively expensive injection molding or compression molding techniques are considered.

In practicing my invention, I employ from 30 to 65 percent of polystyrene, from 30 to 65 percent of the high styrene-low butadiene resinous copolymer, and from 5 to 30 percent of the rubbery butadiene-styrene copolymer, the percentages of the polystyrene, resinous copolymer and rubbery copolymer being by weight and totaling 100 percent. Preferably, I employ from 40 to 60 percent of polystyrene, from 30 to 50 percent of the resinous styrene-butadiene copolymer and from 10 to 20 percent of the rubbery butadiene-styrene copolymer. I particularly prefer those compositions wherein the proportions of polystyrene and resinous butadiene-styrene copolymer are approximately equal.

With the essential components of the compositions of my invention, viz, the polystyrene, styrene-butadiene resin and butadiene-styrene rubbery copolymer, I can also, if desired, incorporate any suitable proportions of fillers, color pigments, etc. Typically the total amount of filler and color pigment will range from 1 to 100 parts per 100 parts of the resin-rubber mixture.

Polystyrene resins having an intrinsic viscosity of 0.75–2.00 and a molecular weight of 10,000–200,000 are applicable in the present invention. However, I prefer to use a benzene-soluble polystyrene resin having a molecular weight of 20,000–100,000.

The resinous styrene-butadiene copolymers used in the present invention are those containing from 80 to 95 percent of combined styrene and correspondingly from 20 to 5 percent of combined butadiene. The resinous styrene-butadiene copolymers used in my invention are made in the well-known manner by emulsion polymerization, coagulation, washing and drying.

Any rubbery copolymer of from 70 to 95 percent of butadiene-1,3 and correspondingly from 30 to 5 percent of styrene can be used in the practice of my invention. Such copolymers can be cross-linked with any suitable cross-linking agent, e. g., divinylbenzene. I can use standard GR–S of either the so-called "hot" or "cold" type. I particularly prefer, however, to employ a rubbery copolymer of from 85 to 95 percent of butadiene-1,3 and correspondingly from 15 to 5 percent of styrene. The compositions of my invention which are made with such copolymers exhibit significantly improved physical characteristics over those made with ordinary GR–S.

The following examples illustrate the invention more fully. All parts and percentages expressed in this specification and in the claims are by weight.

*Examples*

The ingredients specified in the following table were commingled to form a uniform intimate mixture in the conventional manner using an open rubber mill or a Banbury internal mixer at a temperature sufficiently elevated to effect fusion of the several resinous and rubbery components to a uniform mass. The resulting mixtures were then calendered into thin sheets which were then plied up with the calender grain running at right angles in successive plies and then molded under heat and pressure to form a sheet of the desired thickness. The physical properties of molded specimens were then determined, these being set forth in the table.

| Example No. | 1 | 2 | 3 | 4 |
|---|---|---|---|---|
| Polystyrene Resin | 42.50 | 51.00 | 60.00 | 42.50 |
| Styrene/Butadiene Resin 85/15 Ratio, ASTM Heat Distortion (264 p. s. i.), Temp., 146° F | 42.50 | 34.00 | 40.00 | -------- |
| Butadiene/Styrene Rubbery copolymer Ratio 90/10 | 15.00 | -------- | -------- | 15.00 |
| GR–S Rubber, Cross-Linked Type, Butadiene/Styrene Ratio 72/28 | -------- | 15.00 | -------- | -------- |
| Titanox A (Titanium Dioxide—a pigment) | 5.00 | 5.00 | 5.00 | 5.00 |
| Zinc Stearate (Lubricant) | 1.00 | 1.00 | 1.00 | 1.00 |
| Styrene/Butadiene Resin Ratio 85/15, ASTM Heat Distortion (264 p. s. i.) Temp., 97° F | -------- | -------- | -------- | 42.50 |
| Total | 106.00 | 106.00 | 106.00 | 106.00 |

PROPERTIES OF MOLDED SPECIMEN

| | | | | |
|---|---|---|---|---|
| Tensile, p. s. i | 3,150 | 2,800 | 3,400 | 2,900 |
| Elongation, percent | 10–15 | 34 | 1.9 | 18 |
| Modulus of Flexure, p. s. i | 240,000 | 247,000 | 324,000 | 180,000 |
| Rockwell Hardness, R Scale | 82 | 88 | 94 | 58 |
| ASTM Heat Distortion Temp., ° F., at 264 p. s. i | 160 | 162 | 158 | 129 |
| Charpy Notched Impact, ft. lb./in. notch | 3.5 | 2.0 | 0.49 | 1.1 |
| Haircell Grain Loss, Upon Heating 5′ at 350° F | none | none | -------- | -------- |

Materials made in accordance with the present invention with the resinous styrene-butadiene copolymer having a heat distortion temperature of at least 140° F. exhibit a high hardness, as manifested by a Rockwell hardness (R Scale) of at least 80. Hardnesses of this order are highly desirable for many articles manufactured from compositions of this type. The combination of this high hardness with the high impact resistance of the preferred materials of my invention is unusual.

From the foregoing it will be seen that the present invention provides many advantages. It makes available a low cost, tough, plastic material of excellent impact resistance. A particularly noteworthy advantage of the present invention is that sheets of the material of my invention can be shaped by simply pre-heating to the softening point and then forming by a drawing operation using either a male or a female die. This is in marked contrast to polystyrene resins which must be shaped by injection or compression molding in a very accurately and expensively machined mold. An important advantage of the materials of my invention is that if the sheets of the material have been embossed prior to the drawing operation, they do not lose this embossing to any detectable extent during the pre-heating and drawing operation. A further important advantage is that the compositions of my invention can be economically produced on available rubber processing equipment. They can be sold as flat sheets with or without surface grain effects imparted thereto by embossing. Many other advantages of my invention will be apparent to those skilled in the art.

Having thus described my invention, what I claim and desire to protect by Letters Patent is:

1. A composition of matter comprising from 30 to 65 percent of polystyrene, from 30 to 65 percent of a resinous copolymer of from 80 to 95 percent of styrene and correspondingly from 20 to 5 percent of butadiene, and from 5 to 30 percent of a rubbery copolymer of from 70 to 95 percent of butadiene and correspondingly from 30 to 5 percent of styrene, the percentages of said polystyrene and said copolymers being by weight and totaling 100 percent.

2. A composition of matter comprising from 40 to 60 percent of polystyrene, from 30 to 50 percent of a resinous copolymer of from 80 to 95 percent of styrene and correspondingly from 20 to 5 percent of butadiene, and from 10 to 20 percent of a rubbery copolymer of from 70 to 95 percent of butadiene and correspondingly from 30 to 5 percent of styrene, the percentages of said polystyrene and said copolymers being by weight and totaling 100 percent.

3. A composition of matter comprising approximately equal proportions by weight of polystyrene and a resinous copolymer of from 80 to 95 percent of styrene and correspondingly from 20 to 5 percent of butadiene, in admixture with a rubbery copolymer of from 70 to 95 percent of butadiene and correspondingly from 30 to 5 percent of styrene, the percentage of said rubbery copolymer being from 5 to 30 percent by weight based on the sum of the weights of said polystyrene, said resinous copolymer and said rubbery copolymer.

4. A composition of matter comprising from 30 to 65 percent of polystyrene, from 30 to 65 percent of a resinous copolymer of from 80 to 95 percent of styrene and correspondingly from 20 to 5 percent of butadiene, and from 5 to 30 percent of a rubbery copolymer of from 85 to 95 percent of butadiene and correspondingly from 15 to 5 percent of styrene, the percentages of said polystyrene and said copolymers being by weight and totaling 100 percent.

5. A composition of matter comprising from 30 to 65 percent of polystyrene, from 30 to 65 percent of a resinous copolymer of from 80 to 95 percent of styrene and correspondingly from 20 to 5 percent of butadiene and having an ASTM heat distortion temperature of at least 140° F., and from 5 to 30 percent of a rubbery copolymer of from 70 to 95 percent of butadiene and correspondingly from 30 to 5 percent of styrene, the percentages of said polystyrene and said copolymers being by weight and totaling 100 percent.

6. A composition of matter comprising approximately equal proportions by weight of polystyrene and a resinous copolymer of 85 percent of styrene and 15 percent of butadiene, said copolymer having an ASTM heat distortion temperature of at least 140° F., in admixture with a rubbery copolymer of from 85 to 95 percent of butadiene and correspondingly from 15 to 5 percent of styrene, said rubbery copolymer being present in a proportion equal to 15 percent by weight based on the sum of the weights of said polystyrene and said copolymers.

References Cited in the file of this patent

UNITED STATES PATENTS

| Number | Name | Date |
|---|---|---|
| 2,541,748 | Daly | Feb. 13, 1951 |
| 2,574,439 | Seymour | Nov. 6, 1951 |
| 2,578,518 | Ditz | Dec. 11, 1951 |

OTHER REFERENCES

Kolthoff et al., Rubber Chem. and Tech., April 1947, pages 546-550.